USOO5204848A

United States Patent [19]

Cardero et al.

[11] Patent Number: 5,204,848
[45] Date of Patent: Apr. 20, 1993

[54] ADJUSTING AMPLITUDE DETECTION THRESHOLD BY FEEDING BACK TIMING-DATA PHASE ERRORS

[75] Inventors: Silvio A. Cardero; Glen A. Jaquette, both of Tucson, Ariz.

[73] Assignee: International Business Machines Corporation, Armonk, N.Y.

[21] Appl. No.: 716,477

[22] Filed: Jun. 17, 1991

[51] Int. Cl.⁵ .............................................. G11B 7/00
[52] U.S. Cl. ...................................... 369/48; 369/59; 369/124
[58] Field of Search ..................... 369/47, 48, 54, 55, 369/57, 58, 59, 60, 100, 64, 106, 13, 124; 360/59, 114, 32, 53; 358/315, 316, 317, 318, 320, 336, 337, 342; 371/6; 307/265, 267; 328/58

[56] References Cited

U.S. PATENT DOCUMENTS

| 3,483,539 | 12/1969 | Poumakis | 360/45 |
| 3,893,171 | 7/1975 | Marshall et al. | 360/45 |
| 3,984,869 | 10/1976 | Fujii et al. | 369/48 |
| 4,041,526 | 8/1977 | Kaneko | 358/318 |
| 4,068,257 | 1/1978 | Hirota et al. | 358/316 |
| 4,142,208 | 2/1979 | Oprandi et al. | 369/48 |
| 4,338,683 | 7/1982 | Furukawa et al. | 369/59 |
| 4,356,506 | 10/1982 | Yamamitsu | 358/318 |
| 4,417,284 | 11/1983 | Sato | 358/316 |
| 4,418,406 | 11/1983 | Ogawa | 369/124 |
| 4,426,667 | 1/1984 | Masher et al. | 360/44 |
| 4,429,384 | 1/1984 | Kaplinsky | 370/85 |
| 4,580,176 | 4/1986 | Graves et al. | 360/45 |
| 4,672,597 | 6/1987 | Yamazaki | 369/59 |
| 4,831,611 | 5/1989 | Sasaki et al. | 369/54 |
| 4,929,917 | 5/1990 | Yokogawa et al. | 369/47 |
| 4,972,337 | 11/1990 | Eguchi et al. | 360/114 |
| 4,972,401 | 11/1990 | Carasso et al. | 369/59 |
| 5,060,218 | 10/1991 | Chiyomatsu | 369/47 |
| 5,062,005 | 10/1991 | Kitaura et al. | 358/342 |
| 5,065,384 | 11/1991 | Yokogawa | 369/47 |

Primary Examiner—Tommy P. Chin
Assistant Examiner—Thai Tran
Attorney, Agent, or Firm—H. F. Somermeyer

[57] ABSTRACT

When an optical disk recorder having readback circuits is used with pulse width modulated (PWM) signals a phase error of a clocking system with respect to the phase of a data signal is used to generate an amplitude detection threshold offset for serving of the amplitude detection threshold by the phase error signals tending to increase the probability of faithful detection of data carried by the PWM or other signals.

10 Claims, 2 Drawing Sheets

ADJUSTING AMPLITUDE DETECTION THRESHOLD BY FEEDING BACK TIMING-DATA PHASE ERRORS

TECHNICAL FIELD

The present invention relates to signal readback in signal recording systems and particularly to apparatus and methods for enhancing the detection by adjusting detection thresholds.

1. Background of the Invention

In optical recording, such as magnetooptical recording, greatly enhanced lineal data densities can be achieved by using pulse width modulation (PWM) for recording data on an optical medium. A very precise threshold detection is required because of the small tolerances for error in such recording. A consistently reliable amplitude detection threshold is difficult to derive from the input signal because the baseline of such input or readback signal varies with time. Such variations can be caused by birefringence, or non uniformities in the optical medium. Known techniques such as signal envelope following suffer from heavy dependence on equalization techniques. Such techniques also have a sensitivity to mark formation problems (blooming, miscalibrated writing due to medium sensitivity shifts with time as found in magnetooptic recording, and media nonuniformities). These factors significantly reduce the attractiveness of amplitude threshold detection because the low signal to noise ratio tends to prevent effective compensation of these factors. Media sensitivity shift with time (SST) is particularly bothersome because it causes the edge of the written pulse to move along the length of the track thereby give a false transition position. Such variations may cause a direct reduction in the size of the detection window for detecting the edge of the pulse, as is necessary in PWM. Signals recorded at an inappropriate power level, as can happen with optical media subject to SST, shifts the recording characteristics which induce additional possible readback errors.

2. Discussion of the Prior Art

U.S. Pat. No. 4,580,176 describes an adaptive equalization system using phase error feedback for continuously adjusting the equalization of a read channel used in magnetic recording. In clear contradistinction to the teaching of this patent, the present invention feeds back the phase error of a phase lock loop (PLL) for adjusting the analog amplitude detection threshold of a readback channel.

U.S. Pat. No. 3,483,539 describes a circuit interposed between a read detector and a phase lock loop (PLL) for compensating or correcting for baseline shift in the detection of a readback signal from a magnetic record medium. This patent does not suggest how to correct for shifts in the pulse edges of a data stream all of which could have a timed offset with respect to the PLL applied timing pulses. In clear contradistinction to the teaching of this patent, the present invention automatically adjusts the amplitude detection threshold based upon the phase error between the readback signal and PLL timing pulses.

SUMMARY OF THE INVENTION

It is an object of the present invention to provide an automatically-adjusted amplitude-detection threshold which is adjusted for increasing the accuracy of detection timing.

In accordance with the present invention, a readback system of a signal recorder includes a timing means, such as a phase lock loop, slaved to the input signal for generating timing pulses used in detecting the data carried by the readback signal. Phase errors detected between the timing of the readback signal pulse edges and the timing pulses are fedback to adjust the amplitude detection threshold for reducing these phase errors. Such adjustments, based upon clocking phase errors with respect to the readback signal, minimize the clock phase corrections directly and also maximizes the probability of faithful detection of data carried in the readback signal.

The foregoing and other objects, features and advantages of the invention will be apparent from the following more particular description of preferred embodiments of the invention as illustrated in the accompanying drawings.

DETAILED DESCRIPTION OF THE DRAWINGS

Figure 1:
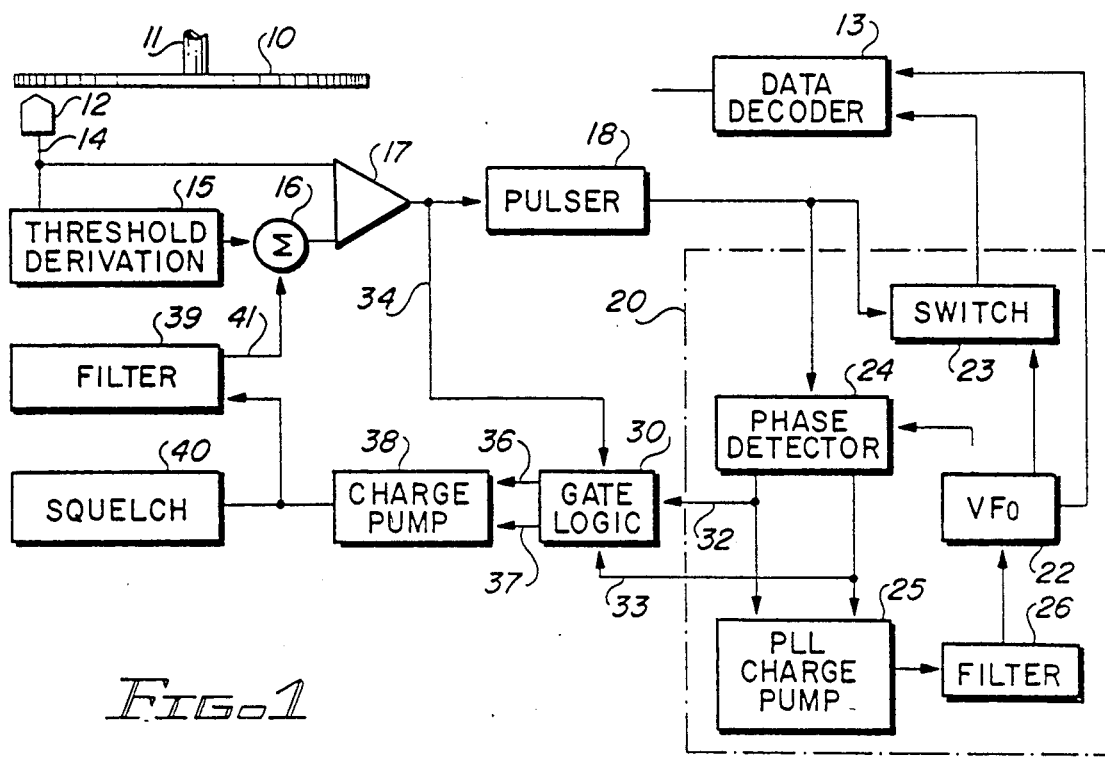
FIG. 1 is a simplified block-schematic diagram of a optical record player incorporating the teachings of the present invention.

A magnetooptic rotatable disk 10 is suitably supported for rotation by a motor 11 on a frame (not shown). In the FIG. 1 illustrated optical device, a pick-up mechanism 12 is in optical cooperative relationship with the recording surface of disk 10 for optically sensing signals recorded thereon. Pick-up 12 can also include electronic amplifiers for amplifying the sensed signals. The FIG. 1 illustrated device can also include apparatus for recording signals on disk 10. The recording on disk 10 is preferably of a pulse width modulated (PWM) type in which the duration of a pulse is indicative of the information carried by the recorded signal. In contrast, pulse position modulation carries information by a presence or absence of a pulse at a given position on the disk 10 or occurring at a given detection time, also referred to as transition position, which represents one bit of information. A PWM pulse can represent any one of a plurality of informational values, i.e., the number 0-4 or 2-7 depending upon the design of the system. The present invention is most advantageously employed with PWM recording in that the marks or recorded pulses are some integral number of clock cycles in duration. According to the invention, when the recorded marks or pulses are consistently read as having too long a duration, an amplitude detection threshold is shifted to an increased or higher amplitude value which reduces the effective duration of the pulses for purposes of detection. The corollary to the above, in accordance with the present invention, when the recorded marks are read as having too short a duration, i.e., are less than a full integral multiple of clock cycles, then the amplitude threshold is reduced for effectively elongating the mark or pulse readback signals such that an integral number of clock cycles occur for the detection process. In one embodiment of the invention, a phase error in a phase lock loop (PLL) is measured and used for adjusting the amplitude threshold.

Such a PWM readback signal is supplied by pick-up 12 over electrical line 14 to threshold derivation circuit 15 as well as to one input of the switching comparator 17. Switching comparator 17 receives the threshold derived from the readback signal by circuit 15 through offset summing circuit 16, as later described. Switching comparator 17 supplies an output pulse transition over line 34 to pulser 18. Pulser 18 shapes the supplied transition of the signal from switching comparator 17 to a pulse which is used for operating the illustrated detection system. Data decoder 13 receives the synchronized data from phase lock loop (PLL) or data synchronizer 20. Data synchronizer 20 consists of a phase lock loop and a data synchronization circuit. Various forms of data synchronizers may be employed. In the present embodiment variable frequency oscillator (VFO) 22 is slaved to the operation of the readback signal on line 14. Pulser 18 supplies its output pulse to phase detector 24 which compares the timing signals of VFO 22 with the received pulses. Depending upon the detected phase error, detector 24 supplies a negative or a positive signal respectively over lines 32 and 33 to PLL charge pump 25. PLL charge pump 25 is constructed in a usual manner for supplying a frequency changing signal through filter 26 to VFO 22. Switch 23, the above mentioned data synchronization circuit, receives the pulses from pulser 18 for retiming the pulses to synchronize the timing of the data pulses to the VFO 22 which are then supplied to data decoder 13 in timed relationship to the clock or VFO 22. Data decoder 13 is also connected to VFO 22 for synchronizing its operations to the synchronized data from switch 23.

Figure 2:
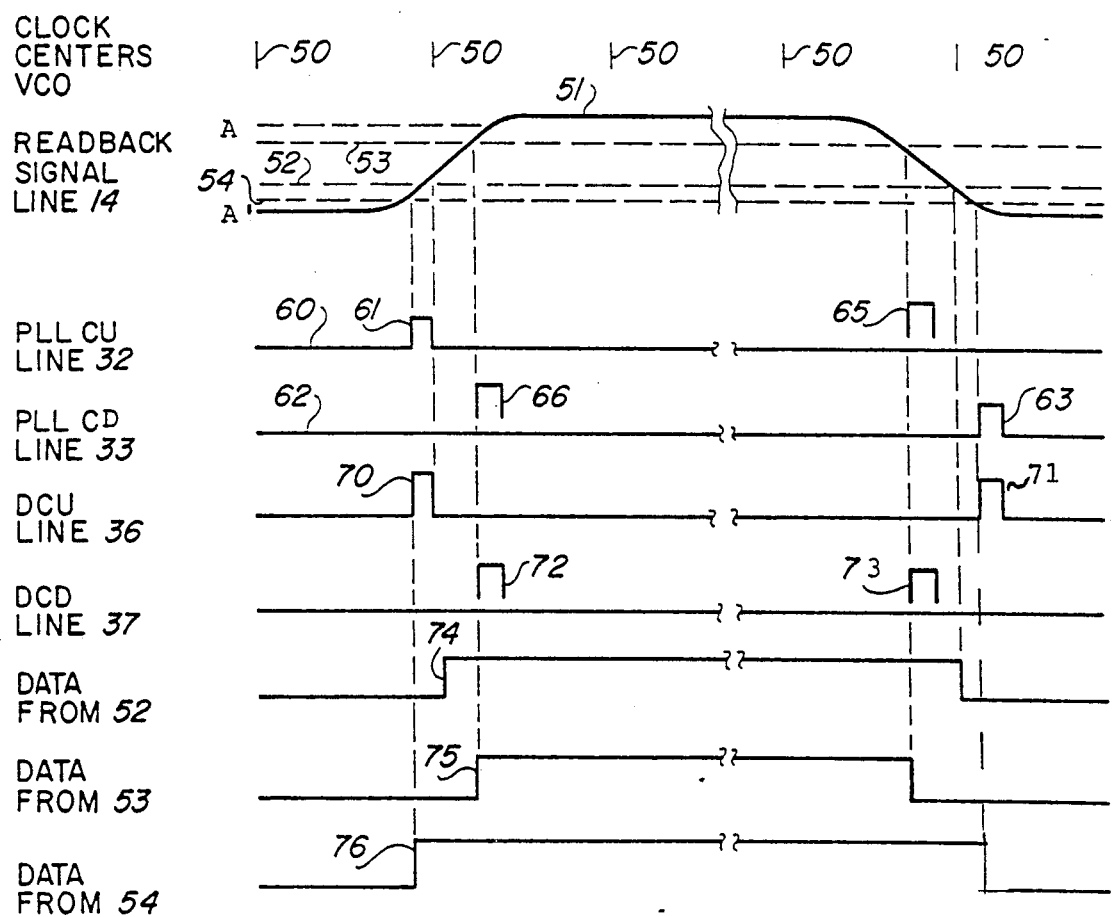
FIG. 2 shows a set of idealized signal readback waveforms and timing pulses used to describe how the FIG. 1 illustrated recorder/player embodies the present invention.

The adjustment of the derived threshold by circuit 15 is achieved in summing circuit 16. The phase errors of VFO 22 operation with respect to the received data pulses from pulser 18 are supplied by phase detector 24 to gate logic 30 respectively over lines 32 and 33. The transitions detected by comparator 17 are also supplied over line 34 to gate logic 30. Gate logic 30 is constructed as described below in Boolean equations. Such gating logic design depends in part on the design of phase detector 24 and the relative timing involved in the operation of the device. Such design is readily achieved by following the Boolean expressions. The term CU and CD represent signals occurring after the detected edge has occurred and respectively indicate a threshold crossing by the readback signal in the upper direction, i.e. the leading edge, or in the downward direction, i.e. trailing edge, as shown in FIG. 2 for readback signal 51. The term D means the value of the data from comparator 17; D' indicates a binary zero while a D indicates a binary one. The term DCU means the signal on line 36 while DCD means the signal on line 36. The Boolean expressions are:

$$DCU = D(CU) + D'(CD) \quad (1)$$

$$DCD = D(CD) + D'(CU) \quad (2)$$

Charge pump 38 responds to the up and down indication signals on line 36 and 37 and is constructed like a PLL charge pump 25. Filter 39 is comparable to filter 26. Charge pump 38 supplies a offset signal through filter 39 to sum circuit 16 which adds or subtracts to the derived threshold value supplied by circuit 15 thereby adjusting the amplitude detection threshold supplied to switching comparator 17. A squelch circuit 40 is inserted for selectively squelching the offset and may be desired in some operations. Derivation of detection thresholds from input signals is well known and not further described here except that integration or signal averaging envelope detection may be used as well as other detection systems, such as mean or average amplitudes between peak values. The derived threshold may also be held constant after the feedback loop, which adjusts the amplitude threshold, is turned on (via deactivation of the squelch circuit 40).

Referring now more particularly to FIG. 2 the operation of the FIG. 1 illustrated circuit is described in more detail. Numeral 50 denotes centers of clock periods in the PWM environment. Line 14 readback signal 51 is shown as having the value A at a relatively positive excursion and a value A' when relatively negative. A desired detection threshold 52 is shown with the location of the detection threshold 52 with respect to the readback waveform 51 is such that the readback waveform 51 amplitude equals detection threshold 52 near the clock centers. Numeral 53 denotes an amplitude detection threshold supplied to switching comparator 17 that has too high a threshold for the readback signal 51 and therefore detects a pulse duration of signal 51 that is too short; see pulses 65 and 66 which occur on lines 32 and 33 respectively which produce pulses 72 and 73 respectively on line 37. In a similar manner, numeral 54 denotes a amplitude detection threshold supplied to switching comparator 17 which has too low an amplitude value resulting in detection of the pulses 61 and 63 which produce pulses 70 and 71 respectively on line 36.

It is seen that the pulses 61, 63, 65 and 66 on signals 60 and 62 respectively represent jitter in the readback system. Such jitter can cause erroneous data synchronization by data synchronizer 20 resulting in erroneous data being sent to data decoder 13. To compensate for such jitter based upon the phase errors, pulses 70 and 71 on DCU line 36 (for the threshold 54 case) and pulses 72 and 73 on DCU line 37 (for the threshold 53 case) are supplied to charge pump 38 for changing its output signal in a known manner through filter 39 for changing the amplitude threshold supplied by offset summer 16 toward the desired amplitude detection threshold 52. Note that the intersection of desired amplitude threshold 52 with the readback signal 51, both on the leading and trailing edges, occurs at a respective one of the clock centers 50.

Desired data output signal 74 is derived from detection threshold 52. When the detection threshold is at too high a threshold, such as threshold 53, output data signal 75 is produced. Similarly, too low detection threshold 54 produces data output signal 76. Detection using the present invention reliably produces data output signal 74.

Another advantage of using the present invention in generating the offset of the amplitude detection threshold by charge pump 38 based on phase error feedback is that the offset value is a signal indicating media or disk 10 nonuniformities and sensitivity shift with time. Such values can be digitized for processing. It is preferred that such offset values be taken from line 41.

As an alternative to the design shown in FIG. 1, a detection threshold can be derived from the phase detector feedback without the use of any conventional or prior art threshold variations as provided through offset summer 16. Another alternative is to use a phase detector (not shown) separate from the PLL (though using the VFO clock line). Also, any type of charge up or charge down integrator may be used instead of a charge pump, followed by a loop filter as is presently practiced and shown in the present application. It is to be remembered that the phase error feedback for adjusting the amplitude detection threshold or for generating an amplitude detection threshold automatically compensates for variations in readback signals derived from magnetooptic media which has been sensitivity shifted with time.

Figure 3:
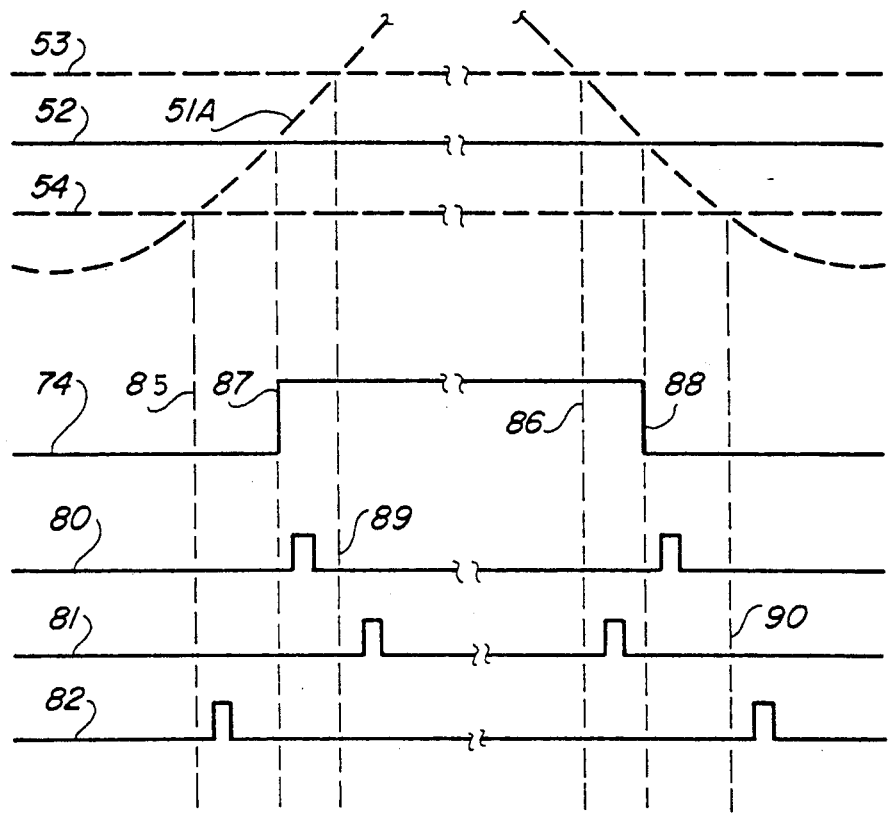
FIG. 3 shows simplified idealized signal waveforms for illustrating timing considerations in practicing the present invention.

Referring next to FIG. 3, the signal timing aspects in practicing the present invention are described. The signal 51A corresponds generally to signal 51 of FIG. 2. Threshold positions 52, 53 and 54 are the same as in FIG. 2. The desired output data signal 74 corresponds to signal 51A crossing threshold 52 as desired resulting in transitions 87 and 88 in the data pulse aligned with signal 51A crossing the detection threshold at the desired threshold position 52. The produced signals from detection are collectively represented by signal 80, i.e. the signals on lines 32, 33, 36 and 37 (FIG. 1) are in substantial time coincidence a short predetermined time after transition 87. If the baseline has shifted downwardly, the threshold position 54 represents the effect of the detection threshold. When signal 51A exceeds the downwardly baseline shifted detection threshold (detects transition 87 too early) as at vertical line 85 and the downward crossing is detected too late, as represented by vertical dashed line 90. The resultant data signal (not shown) corresponds to the positions of the two pulses of signal 82. The signals on lines 32, 33, 36 and 37 are substantially time coincident as represented by signal 82 producing a data D signal which is too long. The invention causes the detection threshold to be raised until the detection threshold is in the correct relationship with the incoming data. Similarly, when the baseline has shifted to a higher amplitude, then threshold position 53 occurs resulting in a too-short data pulse as represented by the signal 81 having pulses time displaced from vertical lines 89 and 86 causing the data signal to be too short as represented by the spacing between the two pulses in signal 81. Again, the present invention causes the threshold to be lowered until the detection threshold is in the correct relationship with the incoming data.

The phase correction equations for the above-described operation are:

$$DCU = D*(PLL\ CU) + D'*(PLL\ CD) \quad (3)$$

$$DCD = D*(PLL\ CD) + D'*(PLL\ CU) \quad (4)$$

Figure 4:
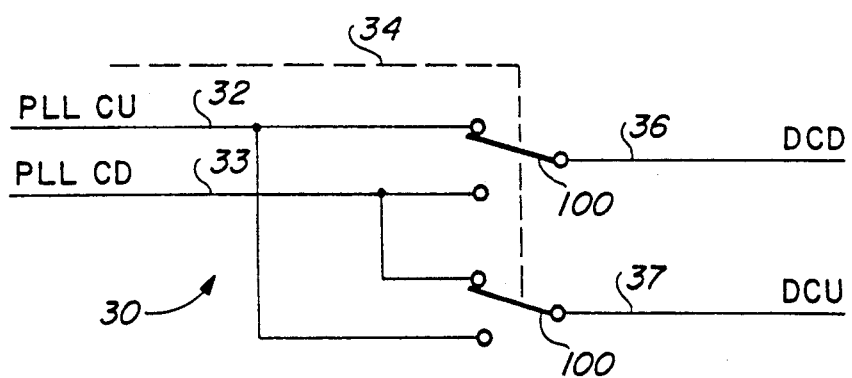
FIG. 4 is a schematic of gate logic 30 used in connection with the FIG. 3 illustrated waveforms.

These equations can be solved by an electronic double-pole double=throw switch 100 as shown in FIG. 4. This circuit represents one constructed implementation of the present invention. The numerals used in FIG. 4 correspond to the FIG. 1 enumeration and description. The pulse on line 34 actuates the switch between its two positions to solve the equations (3) and (4) as can be readily determined by examination. Switch 100 while set as illustrated in FIG. 4 represents a datum value of "0" in the read back signal. As such this position of switch 100 solves the second terms (the terms having D' or a binary 0 datum value) of equations (3) and (4). When switch 100 is set to connect line 33 to lines 36 and 37, switch 100 solves the first terms (terms with D or a datum value of binary 1) of equations (3) and (4). Therefore, switch 100 in the illustrated or up position represents a datum value of "0". The down position of switch 100 corresponds to a datum value of "1". Ignoring the timing of switch 100, equations (1) and (2) are solved for determining the elapsed time between the leading transition 87 (FIG. 3) and the trailing transition 88 of the read back signal 51A. That is, the time difference between DCU and DCD indicate the position of the detection threshold as being at either of the three illustrated positions 52-54 of FIG. 3. Charge pump 38 responds to the supplied signals on lines 36 and 37 in accordance with the elapsed time between DCU and DCD to alter the amplitude detection threshold. That is, charge pump 38 supplies its output current to filter 39 for integration, thereby performing an integrative function of detecting shift of the baseline determined amplitude detection threshold. While signal 74 (FIG. 3) is positive, charge pump supplies a first polarity signal (i.e. like charge pump 25 supplies a first polarity charge while there is a phase lag) and while signal 74 is not positive, an opposite polarity charge signal is supplied by charge pump 38. The time difference between desired duration of signal 74 positive signal excursion and the measured duration of the positive signal excursion is integrated for providing the amplitude threshold adjustment signal to summer 16. This integrative function is performed by the combination of charge pump 38 and filter 39 is identical to the integrative function performed by charge pump 25 and filter 26 of PLL 20, as referred to above. This action is illustrated by examining equations (1) and (2). Equation (1) represents the logic action when a binary "1" datum value is in read back signal, i.e. D occurs after transition 87 and D' (binary 0) occurs after transition 88. Similarly, equation (2) represents the logic action when a binary "0" datum value is in the read back signal. The CU portion (equation 2)(signal value after transition 87) is D' or binary 0 while the CD portion of (2) after transition 88 is D or binary 1. Note that FIG. 3 shows the binary 1 or D value for CU. The binary 0 signal is a negative going signal 51A rather than a positive going signal as shown in FIG. 3. In all other respects, the operations are identical. Of course, the polarity of signal 74 is reversed. Therefore, equations (1) through (4) represent adjusting, in accordance with the present invention, the amplitude threshold for either binary 1 or 0 signal values in the read back signal.

While the invention has been particularly shown and described with reference to preferred embodiments thereof, it will be understood by those skilled in the art that various changes in form and details may be made therein without departing from the spirit and scope of the invention.

What is claimed is:

1. In apparatus for detecting recorded signals in an optical disk recorder/player sensed from an optical medium by a relatively movable pick-up means which supplies a readback electrical signal representative of sensed recorded signals, including, in combination:

baseline threshold means for generating base amplitude detection threshold signal;

a switching comparator connected to the pick-up means and to the baseline threshold means for comparing the base amplitude threshold signal amplitude with the amplitude of the readback electrical signal and supplying readback electrical signal-transition-indicating signals when the readback electrical signal amplitude equals said threshold signal amplitude as the readback signal amplitude crosses said detection threshold;

phase lock loop means connected to the switching comparator for receiving the readback-signal-transition indicating signals for deriving data detection timing pulses from the readback electrical signal amplitude crossing the threshold and generating phase error signals indicating phase errors between the readback electrical signal and the data detection timing pulses;

data synchronization means connected to the phase lock loop means and to the switching comparator for synchronizing the timing pulses with the readback-signal-transition indicating signals; and threshold adaption means in the threshold means and connected to the phase lock loop means for receiving the phase error signals for responding to the received phase error signals for generating an adaptive-amplitude-detection threshold signal having an amplitude that changes amplitude in a direction for reducing the phase error signals toward zero and for combining said adaptive-amplitude-detection threshold signal into said base amplitude detection threshold signal for changing the amplitude of the base amplitude detection threshold signal for reducing said phase errors.

2. In the apparatus set forth in claim 1 further including, in combination:

said baseline threshold means including base means connected to the pick-up means for receiving the readback electrical signal for deriving said base-amplitude-detection threshold signal from the readback signal and having an analog summing means connected to the base means and to said threshold adaption means for combining by analog summing the base-amplitude-detection threshold signal to the adaptive-amplitude-detection threshold signal and the analog summing means being connected to the switching comparator means for supplying the sum of said base and adaptive-amplitude-detection threshold signals to the switching comparator means.

3. In the apparatus set forth in claim 1 further including, in combination:

said phase lock loop means generating said data detection timing signals as a base timing signal for indicating a detection window including a center of said detection window and generating said phase error signals for indicating a deviation of said readback electrical signal crossing the amplitude threshold from a predetermined distance greater than zero from the center of the detection window.

4. In apparatus for detecting recorded signals in an optical disk recorder/player sensed from an optical medium by a relatively movable pick-up means which supplies a readback electrical signal representative of sensed recorded signals, including, in combination:

threshold means connected to the pick-up means for receiving the readback signal for deriving an amplitude detection threshold from the readback signal;

a switching comparator connected to the pick-up means and to the threshold means for comparing the threshold with the amplitude of the readback signal and supplying first pulses each time the readback signal amplitude changes through the threshold;

phase lock loop means connected to the switching comparator for receiving the first pulses for generating detection timing pulses timed to the readback signal amplitude crossing the threshold and generating phase error signals indicating any phase errors between the readback signal and the timing pulses;

data decoding means connected to the phase lock loop means and to the switching comparator for respectively receiving said timing pulses and said first pluses for comparing the timing pulses with the first pulses to amplitude detect and indicate data carried by the readback signal; and threshold adaption means connected to the threshold means and to the phase lock loop means for receiving the phase error signals for generating a threshold adjustment signal indicating the direction of phase error and supplying the threshold adjustment signal to the threshold means for actuating the threshold means to adjust the amplitude detection threshold for reducing the phase error.

5. In the apparatus set forth in claim 4 further including, in combination:

means connected to the threshold means for squelching the threshold adjustment signal such that the phase errors do not change the amplitude detection threshold.

6. In the apparatus set forth in claim 4 further including, in combination:

said optical medium being a magnetooptic signal storage disk.

7. In the apparatus set forth in claim 6 further including, in combination:

said threshold adjustment means including logic means for controlling the amplitude detection adjustment defined by the Boolean expressions:

$$DCU = D(CU) + D'(CD) \tag{1}$$

$$DCD = D(CD) + D'(CU) \tag{2};$$

wherein + indicates logic OR, DCU indicates a logic output signal resulting from a phase error resulting from an amplitude threshold that is too high an amplitude, DCD indicates a logic output signal resulting from a phase error resulting from an amplitude threshold that is too low an amplitude, D and D' are a binary 1 to respectively indicated a binary 0 or binary 1 readback signal value and wherein said D and D' have a zero value respectively for a binary 0 and 1 data values, and (CU) and (CD) are signals having amplitudes indicating phase error between the phase lock loop timing signals and the readback signal as its amplitude crosses said amplitude threshold to respectively indicate said threshold amplitude crossing by the readback signal amplitude respectively on the leading edge (CU) and trailing edge (CD) of the readback signal; and gating means in the logic means connected to the switching comparator to receive said first pulses for gating the CU and CD phase error signals to become said DCD and DCU signals as set forth in the equations (1) and (2), respectively, for the readback signal indicating D and D' binary values.

8. In a machine-effected method of controlling readback and detection of signals from a signal storage medium, including the steps of:

sensing signals stored on the medium for generating a readback signal;

timing a clock to the readback signal for generating a timing signal including comparing the phase of the readback signal and the timing signal for generating a phase errors signal indicating a phase difference between the readback signal and the timing signal; and deriving an amplitude detection threshold signal from the readback signal for detecting information carried in the readback signal, deriving a threshold adjusting signal from said phase error signal, adding the derived adjusting signal to the threshold signal for creating an adjusted amplitude detection threshold signal and detecting the information carried in the readback signal using the adjusted amplitude detection threshold.

9. In the machine-effected method set forth in claim 8 further including the steps of:

providing a switching signal comparator, supplying said readback signal and said adjusted amplitude detection threshold signal to said switching signal comparator in said detecting step and supplying a readback signal transition indicating signal whenever the readback signal amplitude crosses the adjusted amplitude detection threshold for further adjusting the amplitude of said adjusted amplitude detection threshold signal for reducing the amplitude of said phase error signal.

10. In the machine-effected method set forth in claim 9, further including the steps of:

selecting the storage medium to be an optical disk.

* * * * *

UNITED STATES PATENT AND TRADEMARK OFFICE
CERTIFICATE OF CORRECTION

PATENT NO. : 5,204,848

DATED : April 20, 1993

INVENTOR(S) : Silvio A. Cardero, et al.

It is certified that error appears in the above-identified patent and that said Letters Patent is hereby corrected as shown below:

On the title page:
   In the Abstract, line 5, the word "serving" should be --servoing--.

At column 3, line 58, the words "on line 36" should be --on line 37--.

At column 6, line 65, the words "generating base" should be --generating a base--.

At column 7, line 62, the words "sensed recorded signals;" should be --the sensed recorded signals;--.

At column 8, line 15, the words "first pluses" should be --first pulses--.

At column 8, line 18, the words "threshold adaption" should be --threshold adjustment--.

At column 8, line 53, the word "indicated" should be --indicate--.

UNITED STATES PATENT AND TRADEMARK OFFICE
CERTIFICATE OF CORRECTION

PATENT NO. : 5,204,848
DATED : April 20, 1993
INVENTOR(S) : Silvio A. Cardero, et al It is certified that error appears in the above-indentified patent and that said Letters Patent is hereby corrected as shown below:

At column 9, line 9, the word "errors" should be --error--.

Signed and Sealed this

Twenty-sixth Day of April, 1994

Attest:

BRUCE LEHMAN

Attesting Officer      Commissioner of Patents and Trademarks